(12) United States Patent
Cohen

(10) Patent No.: US 12,387,205 B2
(45) Date of Patent: Aug. 12, 2025

(54) METHOD FOR BLOCKCHAIN GAMING BASED ON A STATE CHANNEL

(71) Applicant: Chia Network Inc., San Francisco, CA (US)

(72) Inventor: Bram Cohen, San Francisco, CA (US)

(73) Assignee: Chia Network Inc., San Francisco, CA (US)

( * ) Notice: Subject to any disclaimer, the term of this patent is extended or adjusted under 35 U.S.C. 154(b) by 0 days.

(21) Appl. No.: 18/891,825

(22) Filed: Sep. 20, 2024

(65) Prior Publication Data

US 2025/0104060 A1 Mar. 27, 2025

Related U.S. Application Data

(60) Provisional application No. 63/539,709, filed on Sep. 21, 2023.

(51) Int. Cl.
G06Q 20/38 (2012.01)
(52) U.S. Cl.
CPC ....... *G06Q 20/389* (2013.01); *G06Q 20/3825* (2013.01)
(58) Field of Classification Search
CPC .......................... G06Q 20/389; G06Q 20/3825
USPC ......................................................... 705/75
See application file for complete search history.

(56) References Cited

U.S. PATENT DOCUMENTS

| 2018/0114403 A1 | 4/2018 | Jayachandran |
| 2019/0228019 A1 | 7/2019 | Madisetti et al. |
| 2020/0059364 A1 | 2/2020 | Konda et al. |
| 2021/0334796 A1* | 10/2021 | He ........................ H04L 9/3247 |
| 2022/0100735 A1* | 3/2022 | Poddey ............... G06F 16/2379 |
| 2022/0201071 A1* | 6/2022 | Gaur ..................... H04L 9/3215 |

(Continued)

FOREIGN PATENT DOCUMENTS

| CN | 110064202 B1 | 7/2019 | |
| CN | 114629735 A * | 6/2022 | ........... H04L 12/185 |

OTHER PUBLICATIONS

International Search Report received in PCT/US24/47757 mailed on Nov. 25, 2024; 15 pages.

(Continued)

*Primary Examiner* — Courtney P Jones
(74) *Attorney, Agent, or Firm* — Run8 Patent Group, LLC; Peter Miller; Brian T. Chew

(57) ABSTRACT

A method includes: generating a first transaction configured to spend a first blockchain object representing a first asset, spend a second blockchain object representing a second asset, and generate a state channel object associated with an initial virtual object representing an initial state; transmitting the first transaction to a distributed network for inclusion in a first block of a blockchain; generating a second transaction configured to spend the initial virtual object and generate a first virtual object representing a first state; generating a third transaction configured to spend the state channel object associated with a target virtual object representing a target state, generate a third blockchain object representing a third asset based on the target state, and generate a fourth blockchain object representing a fourth asset based on the target state; and transmitting the third transaction to the distributed network for inclusion in a second block of the blockchain.

20 Claims, 4 Drawing Sheets

(56) References Cited

U.S. PATENT DOCUMENTS

2023/0119482 A1    4/2023  Griggs et al.
2025/0045751 A1*  2/2025  Minaei Bidgoli ..... G06Q 20/02

OTHER PUBLICATIONS

Notification of the International Application Number and the International Filing Date for PCT/US24/47757 mailed on Oct. 3, 2024; 1 page.

* cited by examiner

METHOD FOR BLOCKCHAIN GAMING BASED ON A STATE CHANNEL

CROSS-REFERENCE TO RELATED APPLICATIONS

This application claims the benefit of U.S. Provisional Application No. 63/539,709, filed on 21 Sep. 2023, which is incorporated in its entirety by this reference.

This application is related to U.S. patent application Ser. No. 17/966,214, filed on 14 Oct. 2022, U.S. patent application Ser. No. 17/966,226, filed on 14 Oct. 2022, and U.S. patent application Ser. No. 18/107,430, filed on 8 Feb. 2023, each of which is incorporated in its entirety by this reference.

TECHNICAL FIELD

This invention relates generally to the field of blockchain protocols and more specifically to a new and useful method for blockchain gaming based on a state channel within the field of blockchain protocols.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHODS

Figure 1A:
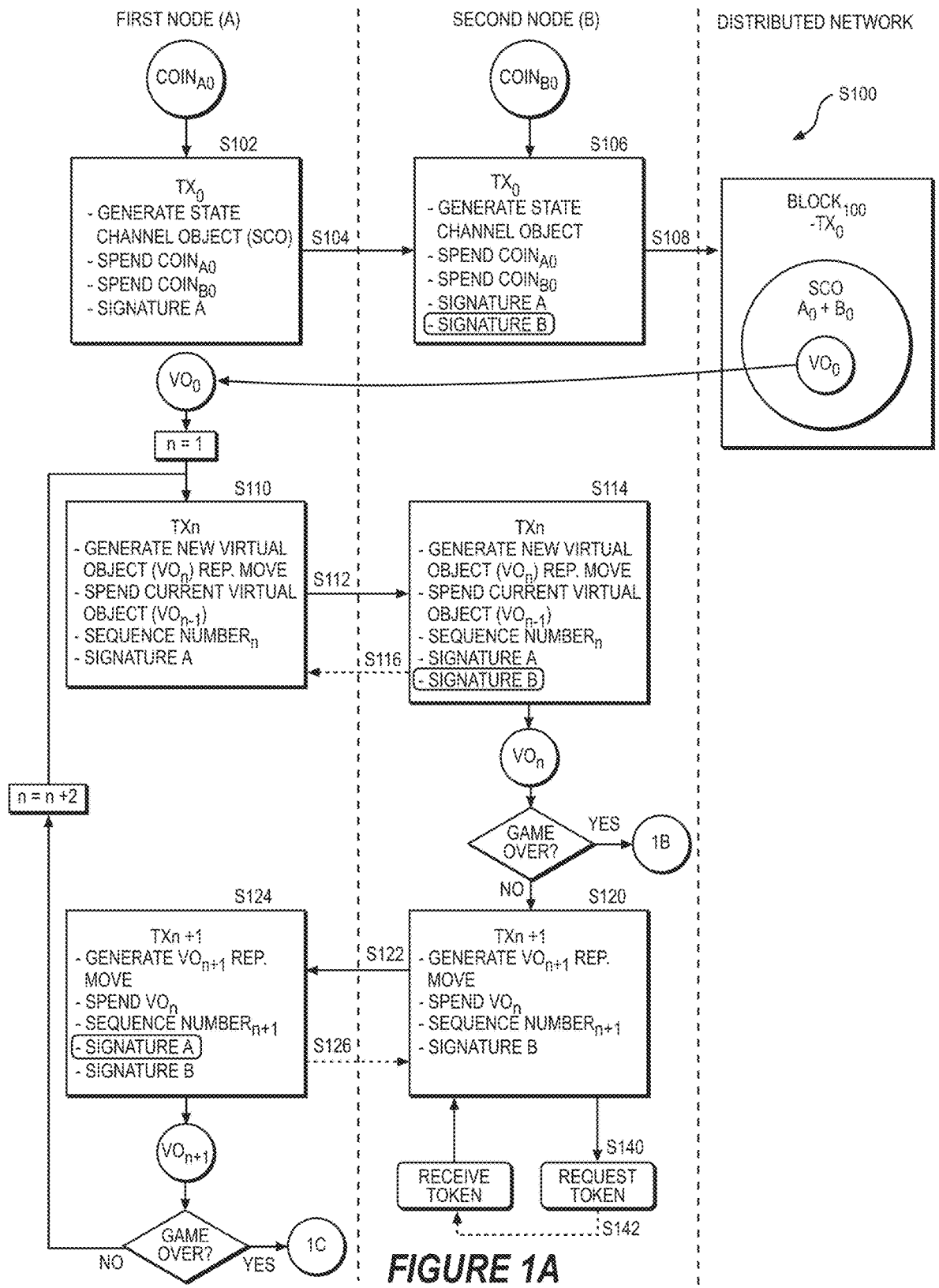
FIGS. 1, A, 1B, and 1C are flowchart representations of a method.
Figure 1B:
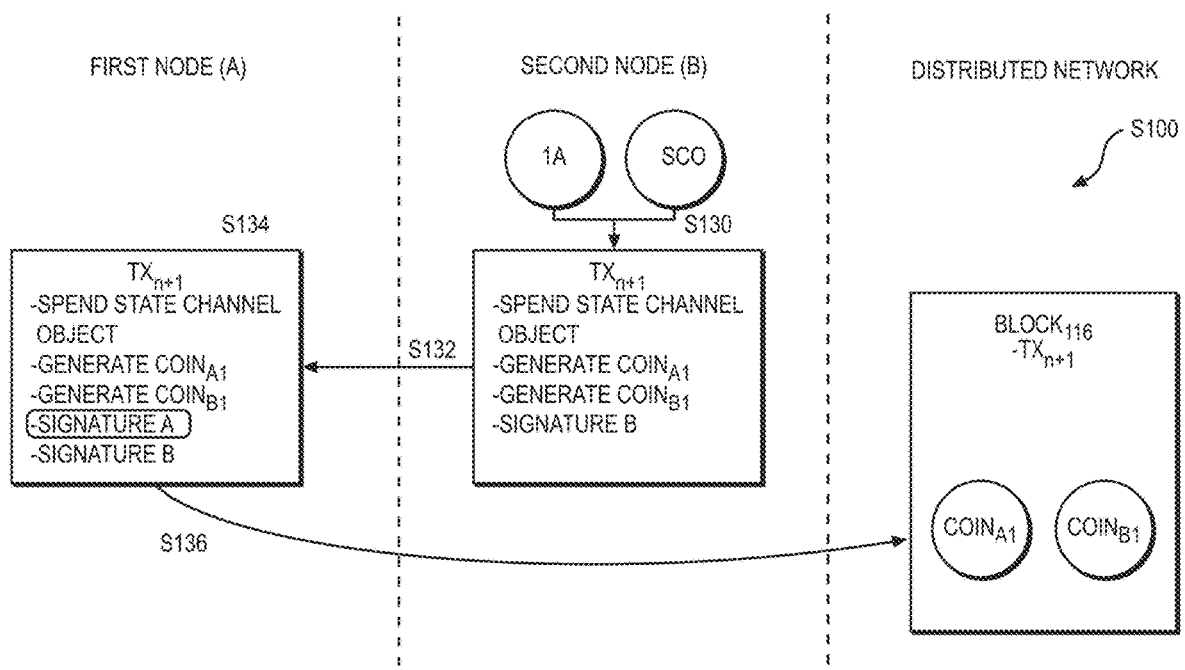
Figure 1C:
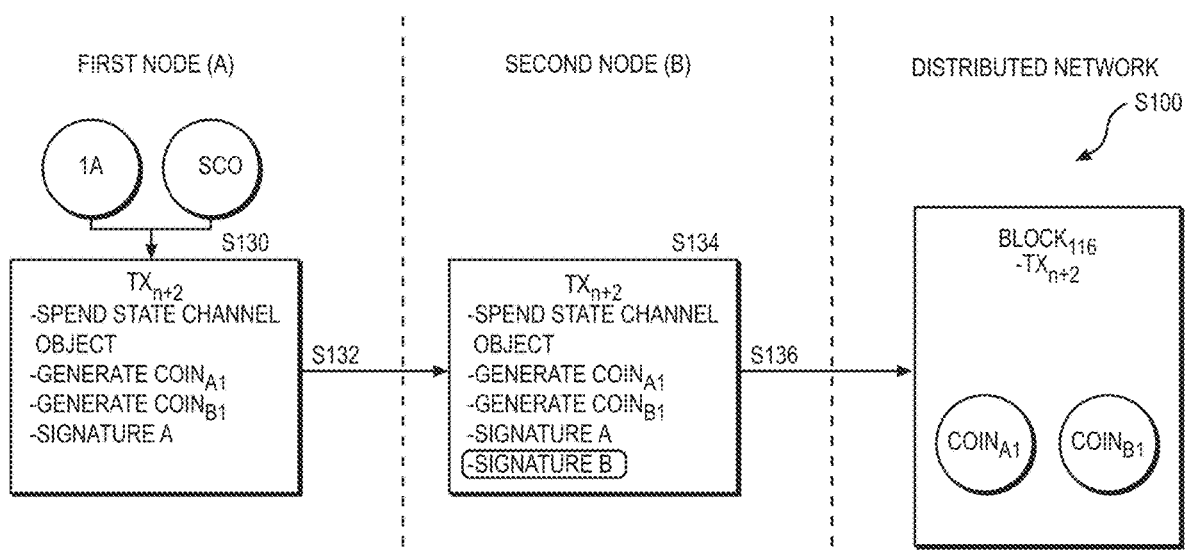

As shown in FIGS. 1A, 1B, and 1C, a method S100 includes, during a first time period by a first node, generating a first transaction including a first signature associated with the first node and configured to: spend a first blockchain object associated with the first node and representing a first amount of an asset for a game; spend a second blockchain object associated with a second node and representing a second amount of the asset for the game; and generate a state channel object associated with an initial virtual object representing an initial state of the game, the first amount of the asset, and the second amount of the asset in Step S102. The method S100 also includes transmitting the first transaction to a second node via a communication network in Step S104.

The method S100 further includes, during the first time period by the second node: cryptographically signing the first transaction based on a second signature associated with the second node as an updated first transaction in Step S106; and transmitting the updated first transaction to a distributed network for inclusion in a first block of a blockchain in Step S108.

The method S100 also includes, during a second time period succeeding the first time period, by the first node: generating a second transaction configured to spend the initial virtual object and generate a first virtual object representing a first state of the game in Step S110; and transmitting the second transaction to the second node via the communication network in Step S112.

The method S100 further includes, during a third time period succeeding the second time period, generating a third transaction configured to: spend the state channel object associated with a target virtual object representing a target state of the game, a third amount of the asset associated with the first node, and a fourth amount of the asset associated with the second node; generate a third blockchain object associated with the first node and representing the third amount of the asset; and generate a fourth blockchain object associated with the second node and representing the fourth amount of the asset in Step S130. The method S100 also includes, during the third time period, transmitting the third transaction to the distributed network for inclusion in a second block of the blockchain in Step S136.

1.1 Variation: Unrolling

As shown in FIGS. 1A, 1B, 1C, and 2, one variation of the method S100 includes, during a first time period by a first node, generating a first transaction including a first signature associated with the first node and a second signature associated with a second node in Step S106, the first transaction configured to: spend a first blockchain object associated with the first node and representing a first amount of an asset for a game; spend a second blockchain object associated with a second node and representing a second amount of the asset for the game; generate a state channel object associated with an initial virtual object representing an initial state of the game, the first amount of the asset, and the second amount of the asset; and generate an unroll object defining a timeout duration. This variation of the method S100 also includes, during the first time period by the first node, transmitting the first transaction to a distributed network for inclusion in a first block of a blockchain in Step S108.

This variation of the method S100 further includes, during a second time period succeeding the first time period by the first node: generating a second transaction configured to spend the initial virtual object and generate a first virtual object representing a first state of the game in Step S110; and transmitting the second transaction to the second node via a communication network in Step S112.

This variation of the method S100 also includes, during a third time period succeeding the second time period, generating a third transaction configured to: spend the unroll object and the state channel object associated with a target virtual object—representing a target state of the game, a third amount of the asset associated with the first node, and a fourth amount of the asset associated with the second node—generated in a target transaction including the first signature and the second signature; and, in response to expiration of the timeout duration, trigger the unroll object to generate a third blockchain object associated with the first node and representing the third amount of the asset and generate a fourth blockchain object associated with the second node and representing the fourth amount of the asset in Step S130. This variation of the method S100 further includes, during the third time period, transmitting the third transaction to the distributed network for inclusion in a second block of the blockchain in Step S136.

1.2 Variation: Referee

As shown in FIGS. 1A, 1B, 1C, and 3, one variation of the method S100 includes, during a first time period by a first node, generating a first transaction including a first signature associated with the first node and configured to: spend a first blockchain object associated with the first node and representing a first amount of an asset for a game; spend a second blockchain object associated with a second node and representing a second amount of the asset for the game; generate a state channel object associated with an initial virtual object representing an initial state of the game, the first amount of the asset, and the second amount of the asset; and generate a referee object configured to verify a rule violation in Step S102. This variation of the method S100 also includes, during the first time period by the first node, transmitting the first transaction to a second node via a communication network in Step S104.

This variation of the method S100 further includes, during the first time period by the second node: cryptographically signing the first transaction based on a second signature associated with the second node as an updated first transaction in Step S106; and transmitting the updated first transaction to a distributed network for inclusion in a first block of a blockchain in Step S108.

This variation of the method S100 also includes, during a second time period succeeding the first time period by the first node: generating a second transaction configured to spend the initial virtual object and generate a first virtual object representing a first state of the game in Step S110; and transmitting the second transaction to the second node via the communication network in Step S112.

This variation of the method S100 also includes, during a third time period succeeding the second time period, generating a third transaction configured to: spend the referee object and the state channel object associated with a target virtual object representing a target state of the game, a third amount of the asset associated with the first node, and a fourth amount of the asset associated with the second node; trigger the referee object to generate an assertion in response to verifying the rule violation based on a validation program and the target state of the game; and, in response to the assertion, generate a third blockchain object associated with the first node and representing the third amount of the asset and generate a fourth blockchain object associated with the second node and representing the fourth amount of the asset in Step S130. This variation of the method S100 further includes, during the third time period, transmitting the third transaction to the distributed network for inclusion in a second block of the blockchain in Step S136.

2. APPLICATIONS

Generally, a computer system including a set of nodes (e.g., computing devices), including a first node and a second node, in a distributed computer network can execute Steps of the method S100: to generate a state channel blockchain object—in a set of extant blockchain objects of a blockchain—associated with a virtual blockchain object representing a current state of a game; and to execute the game based on the state channel blockchain object and/or the virtual blockchain object. More specifically, the first node can execute Steps of the method S100: to generate a first transaction that executes (or "spends") the virtual object representing the current state of the game, that generates a new virtual object representing a new state of the game (e.g., a next move of the game), and that includes a first signature associated with the first node; and to transmit the first transaction to the second node via a communication network external to the blockchain (or "off-chain").

Additionally, the second node can execute Steps of the method S100: to update the first transaction including a second signature associated with the second node to accept (or confirm) the new state of the game in response to receiving the first transaction. The first node and the second node can repeat these Steps of the method S100 for each move of the game. Furthermore, the set of nodes can execute Steps of the method S100: to generate a second transaction that spends the state channel blockchain object—representing a final state of the game—and includes the first signature and the second signature; and to transmit the second transaction to the distributed network for inclusion on a subsequent block of the blockchain.

Therefore, the set of nodes can execute Steps of the method S100: to generate transactions that advance a state of the game; and to transmit these transactions between the first node and the second node—rather than to the distributed computer network for inclusion in a block of the blockchain—during execution of the game, thereby reducing a latency between each move of the game and reducing a total amount of network transaction fees incurred to complete the game.

2.1 Unrolling

Furthermore, the set of nodes can execute Steps of the method S100: to generate an unroll blockchain object defining a timeout duration; and to spend the unroll object in order to record (or "unroll") a most recent state of the game to a block of the blockchain in response to expiration of the timeout duration.

More specifically, a node (e.g., the first node, the second node) can execute Steps of the method S100 to generate and transmit—to the distributed network for inclusion in a subsequent block of the blockchain—a transaction configured to spend the unroll object and/or a state channel object associated with a virtual object—cryptographically signed by the first node (e.g., a first player) and the second node (e.g., a second player)—representing: the most recent state of the game; and a set of sub objects (or "virtual coins") associated with the most recent state of the game, such as a first sub object representing a first bank for the first player, a second sub object representing a second bank for the second player, and a third sub object representing a shared "pot" for the most recent state of the game.

In response to expiration of the timeout duration, the unroll object can automatically generate a set of blockchain objects—representing the most recent state of the game and corresponding to the set of sub objects—in a set of extant (or "unspent") blockchain objects of the blockchain. For example, the unroll object can automatically generate the set of blockchain objects including: a first blockchain object associated with the first node and representing the first bank for the first player; a second blockchain object associated with the second node and representing the second bank for the second player; and/or a third blockchain object representing the shared "pot" for the most recent state of the game in order to enable the first node and second node to continue executing the game.

Therefore, by implementing an unroll object defining a timeout duration, the set of nodes can attempt to commit a most recent state of the game to a block of the blockchain in response to disconnection of a node from the communication network, failure of the node to respond to a move of the game, etc.

2.2 Variation: Entity State

The method S100 is described herein as executed by the set of nodes to generate a state channel blockchain object associated with a virtual blockchain object representing a current state of a game. However, the set of nodes can similarly execute Steps of the method S100: to generate a state channel blockchain object associated with a virtual blockchain object representing a state of an entity (e.g., a data structure, a set of payments between the set of nodes, a table); to generate transactions that advance a state of the entity; to transmit these transactions between the set of nodes during a first time period; and, during a second time period succeeding the first time period, to transmit a transaction—that spends the state channel blockchain object representing a final state of the entity—to the distributed computer network for inclusion on a subsequent block of the blockchain.

3. TERMINOLOGY

Generally, a "blockchain object" (e.g., a coin, a singleton) is referred to herein as a representation of a state within a block on a blockchain.

Generally, a "puzzle" is referred to herein as executable program code represented in a blockchain object.

Generally, a "solution" is referred to herein as a set of arguments passed to a puzzle for execution therewith.

Generally, a "condition" is referred to herein as an output responsive to execution of a puzzle according to a solution.

Generally, "spend" is referred to herein as executing a puzzle—represented in a blockchain object—according to a solution.

Generally, a "signature" is referred to herein as a mathematical scheme for verifying authenticity of digital messages and/or data.

Generally, a "node" is referred to herein as a computing device configured to generate a transaction configured to interact (e.g., generate, spend) with a blockchain object.

Generally, a "full node" is referred to herein a computing device configured to: validate transactions for inclusion in a block of a blockchain; generate the block including validated transactions; and append the block to the blockchain.

Generally, a "state channel object" is referred to herein as a blockchain object representing a state of an entity coordinated between a set of nodes (e.g., two nodes).

Generally, a "virtual object" is referred to herein as a virtual blockchain object—absent from the blockchain and stored at a node in the set of nodes—representing a current, pending state of the entity.

Generally, a "sub object" is referred to herein as a virtual blockchain object
- absent from the blockchain and stored at a node in the set of nodes—representing an amount of an asset (e.g., a cryptocurrency) associated with a party (e.g., a node corresponding to an individual player of a game, a shared "pot" associated with the game).

Generally, a "launcher object" is referred to herein as a blockchain object configured to generate a state channel object.

Generally, an "announcement" is referred to herein as an inter-process communication (e.g., a message) between transactions (or other entities) within a block of the blockchain.

4. BLOCKCHAIN STRUCTURE

Generally, a computer system can include a distributed network including nodes (e.g., computing devices) interconnected through a communication medium (e.g., the Internet, a wide area network, a local area network). Each node in the distributed network can: store a copy of a decentralized database (or "blockchain"); and execute a trustless consensus protocol associated with a state of the decentralized database. The distributed network can include a set of full nodes configured to execute the consensus protocol to extend a blockchain (e.g., a proof-of-space-based blockchain).

Generally, a blockchain includes a data structure including a series of blocks. A block can include a set of transactions between addresses representing entities. For example, the set of transactions can include cryptocurrency transactions and/or smart contracts that enforce specific node behavior.

In one implementation, the set of full nodes can generate and add new blocks to the blockchain. For example, the set of full nodes can generate and add new blocks to the blockchain based on a proof-of-space.

4.1 Generating Blockchain Objects

Generally, a node in the distributed network can submit a transaction (e.g., a network message) to generate a new blockchain object (e.g., a coin, a singleton) representing a state to be recorded on the blockchain. More specifically, the node can submit the transaction defining: a representation of program code (or a "puzzle hash"); a value representing an amount of an asset (e.g., an amount of a cryptocurrency); and/or a unique identifier (or "object ID") of another blockchain object from which the new blockchain object will be generated.

A full node (or a subset of full nodes) in the distributed network can validate the transaction and generate a subsequent block—including the transaction—in the blockchain, thereby adding the blockchain object to a set of blockchain objects (e.g., a set of extant blockchain objects) on the blockchain. Additionally, the node can generate the subsequent block including an object record specifying the set of blockchain objects—including the newly generated blockchain object—on the blockchain.

Accordingly, nodes in the distributed network can access the object record, included in a block (e.g., a most current block) of the blockchain, to identify the set of blockchain objects—including the newly generated blockchain object—on the blockchain, each blockchain object in the set of blockchain objects specifying: a puzzle hash; a value representing an amount of an asset; and an object ID.

4.2 Spending Blockchain Objects

Generally, a node in the distributed network can submit a transaction to execute (or "spend") a target blockchain object in the set of blockchain objects. More specifically, a node can submit a transaction defining a set of features including a target object ID, a target puzzle, a set of arguments (or a "solution") for the target puzzle, and/or a signature.

Based on the set of features, a full node can: identify a blockchain object on the blockchain with which the transaction is associated; validate the transaction; execute the target puzzle according to the solution to generate a set of outputs (or a set of "conditions"); and generate a subsequent block—including the transaction—of the blockchain. Additionally, the full node can generate the subsequent block defining the set of conditions.

For example, the computer system can implement methods and techniques described in U.S. patent application Ser. Nos. 17/966,214, 17/966,226, and/or 18/107,430: to generate a transaction to spend a blockchain object; to submit the transaction to the distributed network for validation and inclusion in a block of the blockchain; to validate the transaction as a validated transaction; to generate a new block including the validated transaction; and to append the new block on the blockchain.

5. BLOCKCHAIN GAMING

Generally, a set of nodes (e.g., two nodes) can execute a game on the blockchain based on a blockchain object representing a state of the game.

In one implementation, the set of nodes can collaborate to generate a blockchain object (or a "first blockchain object") representing an initial state of the game on the blockchain.

In another implementation, a first node—representing a first player of the game—in the set of nodes can generate a first transaction to spend the blockchain object and to generate an updated blockchain object (or a "second blockchain object") representing a new state of the game (e.g., the first player's next move in the game). More specifically, the first node can generate the first transaction configured to: remove the first blockchain object, representing a first state of the game, from a set of extant blockchain objects; and to generate a second blockchain object—representing a second state of the game—in the set of extant blockchain objects. In response to the first transaction including a signature associated with the first node and a second node—representing a second player in the game—in the set of nodes, the first node (or the second node) can submit the first transaction to the distributed network for inclusion in a block in the blockchain.

In response to inclusion of the first transaction in the block in the blockchain, the second node can repeat this process: to generate a second transaction configured to spend the second blockchain object and to generate a third blockchain object representing a third state of the game; and to submit the second transaction to the distributed network for inclusion in a block in the blockchain.

The set of nodes can repeat this process for each "move" until completion of the game.

Accordingly, the set of nodes can execute a game through a set of transactions directly intermediated by the blockchain. Therefore, the set of nodes can: omit a third party to facilitate the game; and avoid a commission fee (or "rake") due to the third party for facilitating the game.

6. STATE CHANNEL OBJECT

Step S102 of the method S100 includes, by the first node, generating a first transaction including a first signature associated with the first node and configured to: spend a first blockchain object associated with the first node and representing a first amount of an asset for a game; spend a second blockchain object associated with a second node and representing a second amount of the asset for the game; and generate a state channel object associated with an initial virtual object representing an initial state of the game, the first amount of the asset, and the second amount of the asset.

Step S104 of the method S100 includes, by the first node, transmitting the first transaction to a second node via a communication network.

The method S100 includes, by the second node: cryptographically signing the first transaction based on a second signature associated with the second node as an updated first transaction in Step S106; and transmitting the updated first transaction to a distributed network for inclusion in a first block of a blockchain in Step S108.

Generally, as shown in FIGS. 1A, 1B, and 1C, the set of nodes can implement a state channel blockchain object (hereinafter a "state channel object") representing a state of an entity. More specifically, the set of nodes can implement the state channel object associated with a virtual blockchain object (hereinafter a "virtual object") representing a current state, such as a current state of a game.

In one implementation, the set of nodes (e.g., a first node and a second node): generates a first transaction—including a first signature associated with the first node and a second signature associated with the second node (and/or an aggregate signature associated with the first node and the second node)—configured to generate a state channel object associated with a virtual object representing a state of the game in Steps S102, S104, and S106; and transmits the first transaction to the distributed network for inclusion in a block of the blockchain in Step S108.

In another implementation, in Step S110, a first node—associated with a first player in the game—generates a second transaction configured to: spend the virtual object (or a "first virtual object") representing a current state (e.g., a first state) of the game; and generate a new virtual object (or a "second virtual object") representing a new state (e.g., a second state) of the game (e.g., including the first player's next move). The first node generates the second transaction including a first signature associated with the first node. The first node transmits the second transaction to the second node—associated with the second player in the game—in the set of nodes in Step S112, such as through a communication network (e.g., a communication network intermediary).

In this implementation, in Step S114, the second node updates the second transaction including a second signature associated with the second node (and/or the aggregate signature associated with the first node and the second node) representing the second player's acceptance of the first player's next move. In response to the first transaction including the first signature and the second signature, the first node and the second node each define the state channel object as associated with the new virtual object. The second node can transmit the updated first transaction to the first node via the communication network in Step S116.

In another implementation, the second node repeats the foregoing methods and techniques to generate a third transaction configured to: spend the second virtual object representing the second state of the game; and generate a third virtual object representing a third state of the game (e.g., including the second player's next move) in Step S120. The second node: generates the third transaction including the second signature associated with the second node; and transmits the second transaction to the first node through the communication network in Block S122.

The first node: updates the second transaction—as an updated second transaction—including the first signature associated with the first node (and/or the aggregate signature associated with the first node and the second node) representing the first player's acceptance of the second player's next move in Step S124; and transmits the updated second transaction to the second node via the communication network in Step S126. In response to the second transaction including the first signature and the second signature, the first node and the second node can each define the state channel object as associated with the third virtual object.

The first node and the second node can repeat the foregoing methods and techniques for each move of the game. In response to completion of the game, a node (e.g., the first node, the second node) can submit a transaction—to the distributed network for inclusion in a subsequent block of the blockchain—to spend the state channel object representing a final state of the game.

Accordingly, by implementing a state channel object associated with a virtual blockchain object (or a set of virtual blockchain objects) representing a current state of the game, the set of nodes can avoid transaction submission and validation steps for every move of the game. Therefore, the set of nodes can: reduce a latency between each move of the game; and reduce a total amount of network transaction fees to complete the game.

6.1 State Channel Object Initialization

Generally, a node can: generate a transaction configured to generate the state channel object; and transmit the transaction to the distributed network for inclusion on a subsequent block of the blockchain.

In one implementation, in Step S102, the first node generates a transaction configured to: spend a first blockchain object associated with the first node and representing a first amount of an asset (e.g., a first amount of a cryptocurrency with which the first player plays the game); spend a second blockchain object associated with the second node and representing a second amount of the asset (e.g., a second amount of a cryptocurrency with which the second player plays the game); and generate a state channel object associated with an initial virtual object representing an initial state of the game, the first amount of the asset, and the second amount of the asset.

In this implementation, the first node: generates the transaction including the first signature associated with the first node in Step S102; and transmits the transaction to the second node via the communication network in Step S104.

In another implementation, in response to receiving the transaction, the second node updates the transaction including the second signature associated with the second node (and/or the aggregate signature associated with the first node and the second node) as an updated transaction in Step S106. In one example, the second node generates the updated transaction based on the transaction and including the second signature associated with the second node. In another example, the second node cryptographically signs the transaction based on the second signature associated with the second node as the updated transaction.

In this implementation, the second node (or the first node) can transmit the updated transaction to the distributed network for inclusion on a subsequent block of the blockchain in Step S108.

In another implementation, a full node: validates the updated transaction; and generates a new block including the updated transaction. More specifically, the full node can generate the new block including the updated transaction and representing the set of extant blockchain objects (or "unspent blockchain objects") including the state channel object and excluding: the first blockchain object; and the second blockchain object, the state channel object defining a value based on the first amount of the asset and the second amount of the asset. The full node can append the new block to the blockchain.

In response to the full node appending the new block to the blockchain, the first node and the second node can execute the game based on the state channel object.

In one variation, the first node generates a transaction including the first signature associated with the first node and configured to: spend a first blockchain object associated with the first node and representing a first amount of an asset (e.g., a first amount of a cryptocurrency with which the first player plays the game); and generate a state channel object associated with an initial virtual object representing an initial state of the game, the first amount of the asset, and the second amount of the asset. The first node transmits the transaction to the second node via the communication network.

In this variation, the second node updates the transaction—as an updated transaction—including the second signature associated with the second node (and/or the aggregate signature associated with the first node and the second node) and further configured to spend a second blockchain object associated with the second node and representing a second amount of the asset (e.g., a second amount of a cryptocurrency with which the second player plays the game). The second node (or the first node) can transmit the updated transaction to the distributed network for inclusion on a subsequent block of the blockchain.

6.1.1 Launcher Object

Generally, a node (e.g., the first node, the second node) can generate a first transaction configured to generate a launcher blockchain object (hereinafter "launcher object").

In one implementation, the first node generates a first transaction configured to generate a launcher object, the launcher object configured to generate an announcement (e.g., an inter-process communication between transactions within a block of the blockchain) representing a first spend of a first blockchain object—associated with the first node and representing a first amount of an asset—and a second spend of the second blockchain object associated with the second node and representing a second amount of the asset.

In another implementation, the first node generates a second transaction configured to: spend the first blockchain object; spend the second blockchain object; trigger the launcher object to generate the announcement in response to the first spend of the first blockchain object and the second spend of the second blockchain object; and generate the state channel object in response to the announcement.

In one variation, the first node generates the second transaction configured: to spend the first blockchain object associated with the first node and representing the first amount of the asset; to spend the second blockchain object associated with the second node and representing the second amount of the asset; and to spend the launcher object. More specifically, the first node can generate the second transaction configured to trigger the launcher object to generate the state channel object—defining a value based on the first amount of the asset and the second amount of the asset—in response to spending the first blockchain object and the second blockchain object. Additionally, the first node can generate the second transaction configured to trigger the launcher object to generate the announcement representing spends of the first blockchain object and the second blockchain object to generate the state channel object defining the value based on the first amount of the asset and the second amount of the asset.

In another implementation, the first node generates a transaction container including: the first transaction; the second transaction; and the first signature associated with the first node. The first node transmits the transaction container to the second node via the communication network.

In response to receiving the transaction container, the second node: updates the transaction container including the second signature associated with the second node (and/or the aggregated signature associated with the first node and the second node) as an updated transaction container; and transmits the updated transaction container to the first node. For example, the second node can cryptographically sign the first transaction container based on the second signature as the updated first transaction container.

The second node (or the first node) transmits the updated transaction container to the distributed network for inclusion on a subsequent block of the blockchain.

Additionally or alternatively, in response to receiving the transaction container, the second node can update the second transaction configured to spend the second blockchain object based on the announcement. More specifically, the second node can update the second transaction configured to spend the second blockchain object that is valid in response to the announcement.

Accordingly, the computer system can implement a transaction configured to execute a first spend of the second blockchain object—the first spend dependent on a second spend of the launcher object—to generate the state channel object. Therefore, by implementing this dependency in the transaction, the second node can ensure that the transaction transfers the second amount of the asset—defined in the second blockchain object—to the state channel object.

The first node and the second node can execute the game based on the state channel object in response to a full node appending the new block—including the transaction container—to the blockchain.

6.2 Virtual Objects

The method S100 includes: generating a second transaction configured to spend the initial virtual object and generate a first virtual object representing a first state of the game in Step S110; and transmitting the second transaction to the second node via the communication network in Step S112.

Generally, the set of nodes can execute the game based on the state channel object associated with a virtual object. More specifically, the set of nodes can execute the game based on the state channel object associated with the virtual object defining: a current state of the game; a current state of values (e.g., a current set of sub objects); a sequence number; and/or a parity.

In one implementation, the set of nodes executes the foregoing methods and techniques to generate a first transaction—including a first signature associated with the first node and a second signature associated with the second node (and/or an aggregate signature associated with the first node and the second node)—configured to: generate a state channel object associated with an initial virtual object representing an initial state of the game; and transmit the first transaction to the distributed network for inclusion in a block of the blockchain.

In another implementation, in Step S110, the first node generates a second transaction including the first signature associated with the first node and configured to: spend the initial virtual object representing the initial state of the game; and generate a first virtual object representing a first state of the game. More specifically, the first node can generate the second transaction configured to generate the first virtual object including a parent identifier associated with the initial virtual object. Additionally, the first node can generate the second transaction including a first sequence number and a first parity (e.g., an odd parity). The first node transmits the second transaction to the second node via the communication network in Step S112.

In response to receiving the second transaction, the second node: cryptographically signs the second transaction based on the second signature associated with the second node as an updated second transaction in Step S114; and transmits the updated second transaction to the first node via the communication network in Step S116.

Accordingly, by updating the second transaction to include the first signature associated with the first node and the second signature associated with the second node, the first node and the second node can: confirm (or consent to) the first state of the game represented in the first virtual object; and define the state channel object as associated with the first virtual object.

In another implementation, in Step S120, the second node executes the foregoing methods and techniques to generate a third transaction including the second signature associated with the second node and configured to: spend the first virtual object representing the first state of the game; and generate a second virtual object representing a second state of the game. More specifically, the second node can generate the third transaction configured to generate the second virtual object including a second parent identifier associated with the first virtual object. Additionally, the second node can generate the third transaction including a second sequence number (e.g., the second sequence number succeeding the first sequence number) and a second parity (e.g., an odd parity). The second node executes the foregoing methods and techniques to transmit the third transaction to the first node via the communication network in Step S122.

In response to receiving the third transaction, the first node executes the foregoing methods and techniques: to cryptographically sign the third transaction based on the first signature associated with the first node as an updated third transaction in Step S124; and to transmit the updated third transaction to the second node via the communication network in Step S126.

The first node and the second node can repeat the foregoing methods and techniques for each move of the game.

Therefore, by updating a state of the game by spending a prior virtual object representing a prior state of the game and generating a new virtual object representing a new state of the game, the first node and the second node can execute and track each move of the game external to the blockchain in order to reduce latency between each move and to reduce a total amount of network transaction fees to complete the game.

6.2.1 Sub Objects

Generally, a node can generate a transaction configured to generate a virtual object representing a set of virtual sub objects (hereinafter "sub objects"). Each sub object in the set of sub objects can represent an amount of the asset associated with a party (e.g., the first node, the second node, a "pot" in a game poker).

Accordingly, by generating the transaction configured to generate the virtual object representing the set of virtual sub objects, a node can generate a subsequent transaction configured to spend the set of sub objects and generate a set of blockchain objects corresponding to the set of sub objects. Therefore, in response to completion of the game, the node can convert the set of virtual sub objects—stored at the node and absent from the blockchain—into the set of blockchain objects recorded in a block of the blockchain.

In one implementation, the set of nodes executes the foregoing methods and techniques to generate a first transaction configured to spend a first blockchain object associated with the first node and representing a first amount of an asset, spend a second blockchain object associated with the second node and representing a second amount of the asset, and generate a state channel object associated with an initial virtual object representing an initial state of the game and a set of sub objects. More specifically, the set of nodes can generate the first transaction configured to generate the state channel object associated with the initial virtual object representing the set of sub objects including: a first sub object representing the first amount of the asset for the first node; and a second sub object representing the second amount of the asset for the second node. For example, the set of nodes can generate the first transaction configured to generate the initial virtual object and/or the set of sub objects.

In another implementation, the first node executes the foregoing methods and techniques to generate a second transaction configured to: spend the initial virtual object representing the initial state of the game; generate a first virtual object representing a first state of the game; spend the first sub object representing the first amount of the asset for the first node; generate a third sub object in the set of sub objects and representing a third amount of the asset associated with the first state of the game; and generate a fourth sub object in the set of sub objects and representing a fourth amount of the asset for the first node and corresponding to a difference between the first amount and the third amount. More specifically, the first node can generate the second transaction configured to remove the first sub object from the set of sub objects.

In another implementation, the second node executes the foregoing methods and techniques to generate a third transaction configured to: spend the first virtual object representing the first state of the game; spend the second sub object representing the second amount of the asset for the second node; spend the third sub object representing the third amount of the asset associated with the first state of the game; generate a second virtual object representing a second state of the game; generate a fifth sub object in the set of sub objects and representing a third amount of the asset associated with the first state of the game and a fifth amount of the asset associated with the second state of the game; and generate a sixth sub object in the set of sub objects and representing a sixth amount of the asset for the second node and corresponding to a difference between the second amount and the fifth amount. More specifically, the second node can generate the third transaction configured to remove the second sub object and the third sub object from the set of sub objects.

7. BLOCKCHAIN COMMITMENT

Step S130 of the method S100 includes generating a third transaction configured to: spend the state channel object associated with a target virtual object representing a target state of the game, a third amount of the asset associated with the first node, and a fourth amount of the asset associated with the second node; generate a third blockchain object associated with the first node and representing the third amount of the asset; and generate a fourth blockchain object associated with the second node and representing the fourth amount of the asset.

Step S136 of the method S100 includes transmitting the third transaction to the distributed network for inclusion in a second block of the blockchain.

Generally, a node (e.g., the first node, the second node) can generate a transaction configured to spend the state channel object according to a target virtual object representing a target state of the game.

In one implementation, in Step S130, the first node generates a transaction configured to: spend a state channel object associated with a target virtual object representing a target state of the game, a first amount of the asset associated with the first node, and a second amount of the asset associated with the second node; generate a first blockchain object associated with the first node and representing the first amount of the asset; and generate a second blockchain object associated with the second node and representing the second amount of the asset.

More specifically, the first node can generate the transaction configured to: spend the state channel object associated with the target virtual object representing a set of sub objects including a first sub object representing the first amount of the asset associated with the first node and second sub object representing the second amount of the asset associated with the second node; generate the first blockchain object based on the first sub object; and generate the second blockchain object based on the second sub object.

In this implementation, the first node: generates the transaction including the first signature associated with the first node in Step S130; and transmits the transaction to the second node via the communication network in Step S132.

In another implementation, in response to receiving the transaction, the second node updates the transaction including the second signature associated with the second node (and/or the aggregate signature associated with the first node and the second node) as an updated transaction in Step S134. In one example, the second node generates the updated transaction based on the transaction and including the second signature associated with the second node. In another example, the second node cryptographically signs the transaction based on the second signature associated with the second node as the updated transaction.

In this implementation, the second node (or the first node) can transmit the updated transaction to the distributed network for inclusion on a subsequent block of the blockchain in Block S136.

Accordingly, the computer system can: generate a transaction configured to generate a group of blockchain objects for the set of nodes based on a final state of the game (e.g., as represented by the set of sub objects) associated with a virtual object stored external to the blockchain; and record the transaction to a block in the blockchain. Therefore, by generating the transaction configured to generate the group of blockchain objects based on the final state of the game, the computer system can bypass transaction submission and validation steps for each player's moves of the game, thereby reducing a latency between these moves and reducing a total amount of network transaction fees to complete the game.

7.1 State Channel Object Spend

In one implementation, the set of nodes generates the transaction defining: a first object ID associated with the state channel object, a first puzzle associated with the state channel object, a first set of arguments (or a first "solution") for the first puzzle, and/or a set of signatures associated with the first node and the second node.

In this implementation, the set of nodes generates the transaction configured to spend the state channel object via execution of the first puzzle—associated with the state channel object—according to the first solution to generate a first set of outputs (or a first set of "conditions").

For example, the first node can generate the transaction defining: the first puzzle associated with the state channel object; the first set of arguments including a target virtual object representing a target state (e.g., a final state) of a game and/or a set of sub objects; and the set of signatures including a first signature associated with the first node and a second signature associated with the second node. The set of sub objects can include: a first sub object associated with the first node and representing a first amount of an asset; and a second sub object associated with the second node and representing a second amount of the asset.

In this example, the first node can generate the transaction configured to spend the state channel object via execution of the first puzzle—associated with the state channel object—according to the target virtual object and/or the set of sub objects to generate the first set of outputs including: a first blockchain object corresponding to the first sub object; and a second blockchain object corresponding to the second sub object.

Therefore, by generating the transaction configured to spend the state channel object, the first node can generate the transaction configured to generate a set of blockchain objects (e.g., the first blockchain object, the second blockchain object) in response to execution of the first puzzle—associated with the state channel object—according to the target virtual object and/or the set of sub objects.

8. EXAMPLE: POKER GAME

In one implementation, a set of nodes (e.g., a first node and a second node) initiates a poker game based on a state channel object associated with a first virtual object. The state channel object (and/or the first virtual object) defines a puzzle hash representing instructions to execute the poker game.

The set of nodes executes the foregoing methods and techniques to generate an initial transaction configured to: spend a first blockchain object associated with the first node and representing a first amount of a cryptocurrency with which the first player plays the poker game; spend a second blockchain object associated with the second node and representing a second amount of the cryptocurrency with which the second player plays the poker game; and generate the state channel object associated with the first virtual object. The set of nodes executes the foregoing methods and techniques to transmit the initial transaction to the distributed network for inclusion in a first block of a blockchain.

In this implementation, prior to initiation of a first hand of the poker game, the set of nodes define the state channel object associated with the first virtual object defining: a first state of the poker game (e.g., zero cards dealt to players); and a first sequence number. More specifically, prior to initiation of the first hand of the poker game, the set of nodes define the state channel object associated with the first virtual object representing a set of sub objects including: a first sub object associated with the first player and exhibiting a first value corresponding to the first amount of the cryptocurrency with which the first player plays the poker game; and a second sub object associated with the second player and exhibiting a second value corresponding to the second amount of the cryptocurrency with which the second player plays the poker game. Additionally, the set of nodes can define the state channel object and/or the first virtual object including the aggregate signature associated with the first node and the second node.

8.1 Poker Game: Ante

In another implementation, the first node generates a first transaction configured to spend the first virtual object and generate a second virtual object defining a second state of the poker game (e.g., zero cards dealt to players, first player ante), a second sequence number, and the set of sub objects including: a third sub object—associated with the first player—exhibiting a third value corresponding to a difference between the first amount and a fourth value representing an "ante" (or a "blind") for the first hand; the second sub object associated with the second player and exhibiting the second value; and a fourth sub object representing a "pot" and exhibiting a fifth value corresponding to the fourth value. More specifically, the first node can generate the first transaction configured to spend the first sub object to generate the third sub object and the fourth sub object. Additionally, the first node can: generate the first transaction including the first signature associated with the first node; and transmit the first transaction to the second node via the communication network.

In another implementation, the second node updates the first transaction—including the second signature associated with the second node and/or the aggregated signature associated with the first node and the second node—as an updated first transaction. Additionally, the second node can transmit the updated first transaction to the first node via the communication network.

In another implementation, the second node generates a second transaction configured to spend the second virtual object and generate a third virtual object defining a third state of the poker game (e.g., zero cards dealt to players, first player ante, second player ante), a third sequence number, and the set of sub objects including: the third sub object associated with the first player and exhibiting the third value; a fifth sub object—associated with the second player—exhibiting a sixth value corresponding to a difference between the second amount and the third value representing the "ante" for the first hand; and a sixth sub object exhibiting a seventh value corresponding to double the third value (i.e., a sum of each player's ante). More specifically, the second node can generate the second transaction configured to spend the second sub object and the fourth sub object to generate the fifth sub object and the sixth sub object. Additionally, the second node can: generate the first transaction including the second signature associated with the second node; and transmit the first transaction to the first node via the communication network.

In another implementation, the first node updates the second transaction—including the first signature associated with the first node and/or the aggregated signature associated with the first node and the second node—as an updated second transaction. Additionally, the first node can transmit the updated second transaction to the second node via the communication network.

8.2 Poker Game: Deal & Bet

In one implementation, the first node can generate a third transaction configured to spend the third virtual object and generate a fourth virtual object defining a third state of the poker game (e.g., five cards dealt to each player, first player bets), a fourth sequence number, and the set of sub objects including: a seventh sub object—associated with the first player—exhibiting an eighth value corresponding to a difference between the third amount and a ninth value representing a first "bet" by the first player; the fifth sub object associated with the second player and exhibiting a sixth value; and an eighth sub object representing the "pot" and exhibiting a tenth value corresponding to a sum of the seventh value and the ninth value. More specifically, the first node can generate the third transaction configured to spend the third sub object and the sixth sub object to generate the seventh sub object and the eighth sub object. Additionally, the first node can: generate the third transaction including the first signature associated with the first node; and transmit the third transaction to the second node via the communication network.

8.3 Poker Game: Fold

Generally, the second node can generate a fourth transaction configured to spend the fourth virtual object and generate a fifth virtual object defining a fourth state of the poker game representing the second player's next move.

In one implementation, the second node generates the fourth transaction configured to spend the fourth virtual object and generate the fifth virtual object defining the fourth state of the poker game (e.g., five cards dealt to each player, first player bets, second player folds, first player wins the hand), a fifth sequence number, and the set of sub objects including: a ninth sub object—associated with the first player—exhibiting an eleventh value corresponding to a sum of the eighth value and the tenth value (i.e., the first player wins the pot); and the fifth sub object associated with the second player and exhibiting the sixth value. More specifically, the second node can generate the fourth transaction configured to spend the seventh sub object and the eighth sub object to generate the ninth sub object. Additionally, the second node can: generate the fourth transaction including the second signature associated with the second node; and transmit the fourth transaction to the first node via the communication network.

In another implementation, the first node updates the fourth transaction—including the first signature associated with the first node and/or the aggregated signature associated with the first node and the second node—as an updated fourth transaction. Additionally, the first node can transmit the updated fourth transaction to the second node via the communication network.

8.4 Poker Game: Alternative Moves

In one variation, the second node generates the fourth transaction configured to spend the fourth virtual object and generate the fifth virtual object defining a fifth state of the poker game representing a "call" by the second player, the fifth sequence number, and the set of sub objects including: the seventh sub object associated with the first player and exhibiting the eighth value; a tenth sub object—associated with the second player—exhibiting a twelfth value corresponding to a difference between the sixth value and the ninth value (representing a "call" by the second player); and an eleventh sub object representing the "pot" and exhibiting a thirteenth value corresponding to a sum of the tenth value and the ninth value. More specifically, the second node can generate the fourth transaction configured to spend the fifth sub object and the eighth sub object to generate the tenth sub object and the eleventh sub object. Additionally, the second node can: generate the fourth transaction including the second signature associated with the second node; and transmit the fourth transaction to the first node via the communication network.

The first node can update the fourth transaction—including the first signature associated with the first node and/or the aggregated signature associated with the first node and the second node—as an updated fourth transaction. Additionally, the first node can transmit the updated fourth transaction to the second node via the communication network.

In response to the first player winning the first hand based on the fifth state of the poker game, the first node and/or the second node can generate a fifth transaction configured to spend the fifth virtual object and generate a sixth virtual object defining the set of sub objects including: a twelfth sub object—associated with the first player—exhibiting a fourteenth value corresponding to a sum of the eighth value and the thirteenth value (i.e., the first player wins the pot); and the tenth sub object associated with the second player and exhibiting the twelfth value. More specifically, the first node and/or the second node can generate the fifth transaction configured to spend the seventh sub object and the eleventh sub object to generate the twelfth sub object.

Alternatively, in response to the second player winning the first hand based on the fifth state of the poker game, the first node and/or the second node can generate the fifth transaction configured to spend the fifth virtual object and generate the sixth virtual object defining the set of sub objects including: the seventh sub object associated with the first player and exhibiting the eighth value; and a thirteenth sub object—associated with the second player—exhibiting a fifteenth value corresponding to a sum of the twelfth value and the thirteenth value (i.e., the second player wins the pot). More specifically, the first node and/or the second node can generate the fifth transaction configured to spend the tenth sub object and the eleventh sub object to generate the twelfth sub object.

In another variation, the second node can execute similar methods and techniques to generate the fourth transaction configured to spend the fourth virtual object and generate the fifth virtual object defining a fifth state of the poker game representing a "raise" by the second player. In this variation, the first node and the second node can repeat steps described above until a node generates a transaction configured to generate a virtual object defining a state of the poker game representing a call (or a fold) by a player.

8.5 Poker Game: Blockchain Commitment

In one implementation, in response to completion of the poker game (e.g., completion of the first hand) the first node and/or the second node generates a sixth transaction configured to: spend the state channel object associated with sixth virtual object; spend the set of sub objects, such as the twelfth sub object—associated with the first player—exhibiting the fourteenth value and the tenth sub object associated with the second player and exhibiting the twelfth value; and generate a set of blockchain objects corresponding to the set of sub objects. More specifically, the first node and/or the second node executes the foregoing methods and techniques: to generate the sixth transaction including the first signature associated with the first node and the second signature associated with the second node; and transmit the sixth transaction to the distributed network for inclusion in a second block of the blockchain.

In one example, the first node generates the sixth transaction configured to: spend the state channel object associated with sixth virtual object via execution of a puzzle—associated with the state channel object—according to the set of sub objects; and generate the set of blockchain objects corresponding to the set of sub objects in response to execution of the puzzle according to the set of sub objects. The set of blockchain objects include: a third blockchain object associated with the first node and exhibiting the fourteenth value; and a fourth blockchain object associated with the second player and exhibiting the twelfth value.

In another example, the first node generates the sixth transaction configured to: spend the state channel object associated with sixth virtual object; spend the twelfth sub object associated with the first player and exhibiting the fourteenth value; spend the tenth sub object associated with the second player and exhibiting the twelfth value; generate a third blockchain object associated with the first node and exhibiting the fourteenth value; and generate a fourth blockchain object associated with the second player and exhibiting the twelfth value.

Therefore, the set of nodes can: track a current state of the poker game based on a series of virtual objects and a set of sub objects stored external to the blockchain; and commit a final state of the poker game to a block of the blockchain by "converting" the set of sub objects into a set of blockchain objects recorded in the block.

9. UNROLLING

Figure 2:
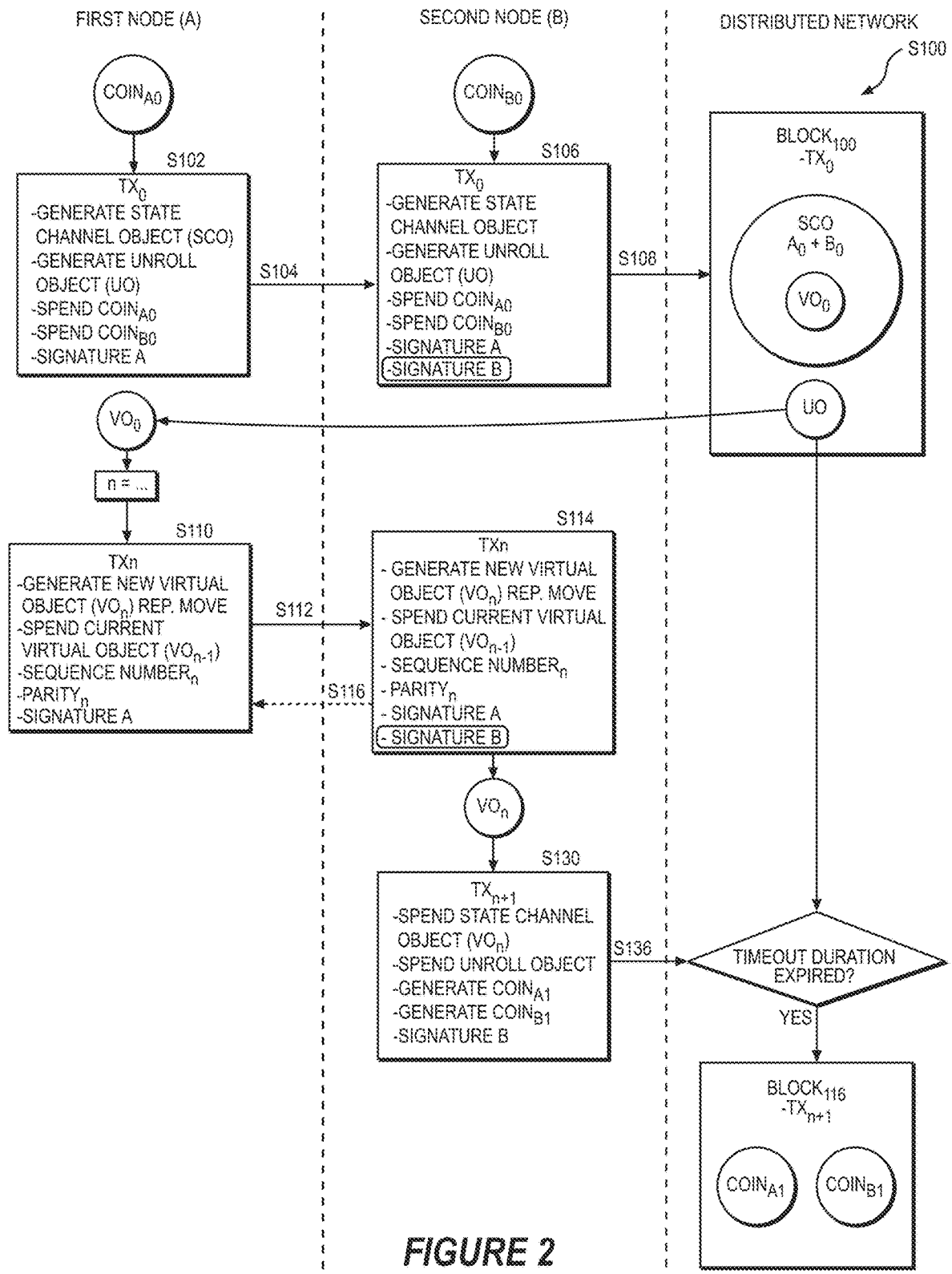
FIG. 2 is a flowchart representation of one variation of the method.

Generally, as shown in FIG. 2, a node in the set of nodes can submit a transaction—to the distributed network—configured to spend the state channel object (or "unroll") representing a most recent state of the game stored by the node and including signatures associated with the first node and the second node.

In one variation, a node (e.g., a first node, a second node) executes the foregoing methods and techniques to generate an initial transaction configured to: generate a state channel object associated with an initial virtual object representing an initial state of the game, an initial set of sub objects (e.g., a first sub object associated with the first node and exhibiting a first value, a second sub object associated with the second node and exhibiting a second value), and an initial sequence number; and generate an unroll blockchain object (hereinafter an "unroll object") defining a timeout duration (e.g., five minutes, ten minutes). The node executes the foregoing methods and techniques: to generate the initial transaction including a first signature associated with the first node and a second signature associated with the second node (and/or the aggregate signature associated with the first node and the second node); and to transmit the initial transaction to the distributed network for inclusion in a first block of the blockchain.

For example, a first node can generate the initial transaction including the first signature associated with the first node and configured to: spend a first blockchain object associated with the first node and representing a first amount of an asset; and generate the state channel object associated with the initial virtual object. The first node can transmit the initial transaction to the second node via the communication network.

In this example, the second node can update the initial transaction—as an updated initial transaction—including the second signature associated with the second node (and/or the aggregate signature associated with the first node and the second node) and further configured to spend a second blockchain object associated with the second node and representing a second amount of the asset. More specifically, the second node can generate the updated initial transaction based on the initial transaction, the updated initial transaction: including the first signature associated with the first node and the second signature associated with the second node; configured to spend the first blockchain object; configured to spend the second blockchain object; configured to generate the state channel object; and configured to generate the unroll object. The second node (or the first node) can transmit the updated transaction to the distributed network for inclusion on the first block of the blockchain.

In another variation, the first node generates a first transaction configured to spend the unroll object and/or the state channel object associated with a first virtual object—cryptographically signed by the first node and the second node (e.g., the first virtual object generated by a prior transaction including the first signature associated with the first node and the second signature associated with the second node)—representing: a first state of the game; a first set of sub objects (e.g., a third sub object associated with the first node and exhibiting a third value, a fourth sub object associated with the second node and exhibiting a fourth value); and a first sequence number. The first node executes the foregoing methods and techniques to transmit the first transaction to the distributed network for inclusion in a second block of the blockchain.

During a time period succeeding generation of the unroll object and preceding expiration of the timeout duration, the second node can generate a second transaction configured to spend the unroll object and/or the state channel object associated with a second virtual object—cryptographically signed by the first node and the second node (e.g., the second virtual object generated by a second prior transaction including the first signature associated with the first node and the second signature associated with the second node)—representing: a second state of the game; a second set of sub objects (e.g., a fifth sub object associated with the first node and exhibiting a fifth value, a sixth sub object associated with the second node and exhibiting a sixth value); and a second sequence number. The second node executes the foregoing methods and techniques to transmit the second transaction to the distributed network for inclusion in the second block of the blockchain.

In response to expiration of the timeout duration and in response to the first sequence number exceeding the second sequence number (or absence of the second transaction), the unroll object automatically: generates a third blockchain object associated with the first node and exhibiting the first value; and generates a fourth blockchain object associated with the second node and exhibiting the second value.

Accordingly, the first node can generate the first transaction configured to trigger the unroll object: to generate the third blockchain object—in a set of extant blockchain objects of the blockchain—corresponding to the third sub object associated with the first state of the game; and to generate the fourth blockchain object in the set of extant blockchain objects and corresponding to the fourth sub object associated with the first state of the game.

Alternatively, in response to expiration of the timeout duration and in response to the second sequence number exceeding the first sequence number, the unroll object automatically: generates a fifth blockchain object associated with the first node and exhibiting the third value; and generates a sixth blockchain object associated with the second node and exhibiting the fourth value.

Accordingly, the second node can generate the second transaction configured to trigger the unroll object: to generate the fifth blockchain object—in the set of extant blockchain objects of the blockchain—corresponding to the fifth sub object associated with the second state of the game; and to generate the sixth blockchain object in the set of extant blockchain objects and corresponding to the sixth sub object associated with the second state of the game.

Therefore, by implementing an unroll object defining a timeout duration, the set of nodes can attempt to commit a most recent state of the game and including signatures associated with the first node and the second node in response to disconnection of a node from the communication network, failure of the node to respond to a move of the game, etc.

9.1 Virtual Object Parity

In another variation, the set of nodes executes the foregoing methods and techniques to generate an initial transaction configured to generate a state channel object associated with an initial virtual object and an unroll object defining a timeout duration; and to transmit the initial transaction to the distributed network for inclusion in a first block of the blockchain. More specifically, the set of nodes can generate the initial transaction configured to generate the unroll object configured to generate a set of blockchain objects based on the timeout duration, a target parity of a target virtual object, and/or a target sequence number of the target virtual object.

In this variation, the first node executes the foregoing methods and techniques to generate a first transaction configured to spend the unroll object and/or the state channel object associated with a first virtual object—defining a first parity (e.g., an even parity)—representing: a first state of the game; a first set of sub objects (e.g., a third sub object associated with the first node and exhibiting a third value, a fourth sub object associated with the second node and exhibiting a fourth value); and a first sequence number. The first virtual object is cryptographically signed by the first node and the second node (e.g., the first virtual object generated by a prior transaction including the first signature associated with the first node and the second signature associated with the second node). The first node executes the foregoing methods and techniques to transmit the first transaction to the distributed network for inclusion in a second block of the blockchain.

During a time period succeeding generation of the unroll object and preceding expiration of the timeout duration, the second node executes the foregoing methods and techniques to generate a second transaction configured to spend the unroll object and/or the state channel object associated with a second virtual object—defining a second parity (e.g., an odd parity)—representing: a second state of the game; a second set of sub objects (e.g., a fifth sub object associated with the first node and exhibiting a fifth value, a sixth sub object associated with the second node and exhibiting a sixth value); and a second sequence number. The second virtual object is cryptographically signed by the first node and the second node (e.g., the second virtual object generated by a prior transaction including the first signature associated with the first node and the second signature associated with the second node). The second node executes the foregoing methods and techniques to transmit the second transaction to the distributed network for inclusion in the second block of the blockchain.

In response to expiration of the timeout duration—and in response to the first sequence number exhibiting the second parity and exceeding the second sequence number (or absence of the second transaction)—the unroll object automatically: generates a first blockchain object associated with the first node and exhibiting the first value; and generates a second blockchain object associated with the second node and exhibiting the second value.

Alternatively, in response to expiration of the timeout duration—and in response to the second sequence number exhibiting the first parity and exceeding the first sequence number—the unroll object automatically: generates a third blockchain object associated with the first node and exhibiting the third value; and generates a fourth blockchain object associated with the second node and exhibiting the fourth value.

Accordingly: the first node can generate the first transaction configured to trigger the unroll object to generate a first set of blockchain objects (e.g., the first blockchain object, the second blockchain object) based on the first parity and the first sequence number defined by the first virtual object; and the second node can generate the second transaction configured to trigger the unroll object to generate a second set of blockchain objects (e.g., the third blockchain object, the fourth blockchain object) based on the second parity and the second sequence number defined by the second virtual object.

10. REFEREE

Figure 3:
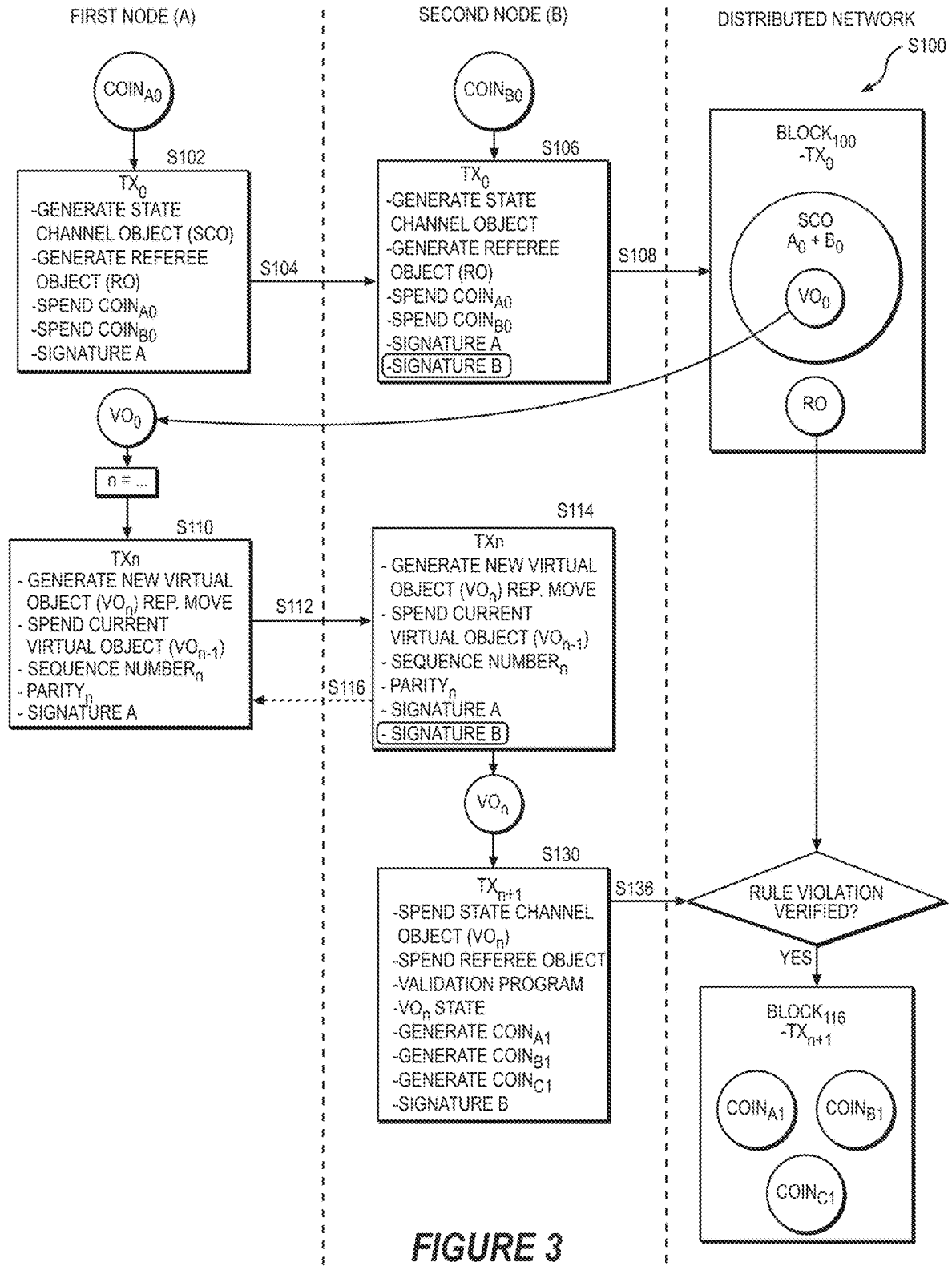
FIG. 3 is a flowchart representation of one variation of the method.

Generally, as shown in FIG. 3, a node in the set of nodes can generate a first transaction configured to generate a referee blockchain object (hereinafter "referee object"). A target in the set of nodes can generate a second transaction configured to spend the referee object to verify that an attempt to cheat has occurred, the second transaction defining: a new state of a game (representing a move); a validation program (or validation program hash); and/or evidence (e.g., specification of a rule violation), etc.

In response to absence of verifying that cheating has occurred, the referee object can return a failure (or false) assertion.

Alternatively, in response to verifying that cheating has occurred, the referee object can: return a true assertion; and spend the state channel object configured to generate a set of blockchain object corresponding to a set of sub objects.

In one variation, a node (e.g., a first node, a second node) executes the foregoing methods and techniques to generate an initial transaction configured to: generate a state channel object associated with an initial virtual object representing an initial state of the game, an initial set of sub objects (e.g., a first sub object associated with the first node and exhibiting a first amount of an asset, a second sub object associated with the second node and exhibiting a second amount of the asset), and an initial sequence number; and generate a first transaction configured to generate a referee object configured to verify a rule violation of the game. The node executes the foregoing methods and techniques: to generate the first transaction including a first signature associated with the first node and a second signature associated with the second node (and/or the aggregate signature associated with the first node and the second node); and to transmit the first transaction to the distributed network for inclusion in a first block of the blockchain.

In this variation, the first node executes the foregoing methods and techniques to generate a second transaction configured to spend the referee object and/or the state channel object associated with a target virtual object representing: a target state of the game; and a target set of sub objects (e.g., a third sub object associated with the first node and exhibiting a third amount of the asset, a fourth sub object associated with the second node and exhibiting a fourth amount of the asset, a fifth sub object associated with the target state of the game and exhibiting a fifth amount of the asset).

More specifically, the first node can generate the second transaction defining: a validation program; the target state of the game represented by the target virtual object; and/or a set of data representing evidence of a rule violation. Additionally, the first node can generate the second transaction configured to trigger the referee object to generate an assertion in response to verifying the rule violation based on the validation program, the target state of the game, and/or the set of data representing evidence of the rule violation.

The first node executes the foregoing methods and techniques to transmit the first transaction to the distributed network for inclusion in a second block of the blockchain.

In response to assertion, the state channel object automatically generates a set of blockchain objects—in a set of extant blockchain objects of the blockchain—corresponding to the target set of sub objects associated with the target state of the game.

In one example, the first node generates the second transaction configured to: spend the referee object and the state channel object associated with the target virtual object;

trigger the referee object to generate an assertion in response to verifying the rule violation based on the validation program and the target state of the game; and generate a first set of blockchain objects in response to the assertion, the first set of blockchain objects including: a third blockchain object (e.g., corresponding to the third sub object associated with the first node and exhibiting the third amount of the asset) associated with the first node and representing the third amount of the asset; and a fourth blockchain object (e.g., corresponding to the fourth sub object associated with the second node and exhibiting the fourth amount of the asset) associated with the second node and representing the fourth amount of the asset.

Additionally, the first node can generate the second transaction configured to generate the first set of blockchain objects—in response to the assertion—further including: a fifth blockchain object (e.g., corresponding to the fifth sub object associated with the target state of the game and exhibiting the fifth amount of the asset) associated with the target state of the game (e.g., a "pot" of a poker game) and representing the fifth amount of the asset; and/or a sixth blockchain object representing the target state of the game.

Therefore, the set of nodes can transmit the second transaction—configured to generate the fifth blockchain object in the set of extant blockchain objects—to the distributed network for inclusion in the second block of the blockchain, thereby enabling the set of nodes to continue playing the game "on-chain" via the first set of blockchain objects in response to the referee object verifying the rule violation.

Alternatively, the first node can generate the second transaction configured to generate the first set of blockchain objects—in response to the assertion—including: the third blockchain object (e.g., corresponding to the third sub object and the fifth sub object) associated with the first node and representing a sixth amount of the asset corresponding to a sum of the third amount of the fifth amount; and a fourth blockchain object (e.g., corresponding to the fourth sub object) associated with the second node and representing the fourth amount of the asset.

Accordingly, the first node can trigger the referee object to award the first node with the fifth amount of the asset associated with the target state of the game (e.g., a "pot" of a poker game) in response to the referee object verifying the rule violation.

10.1 Referee Object Spend

In another variation, the first node generates the second transaction defining: a second object ID associated with the referee object, a second puzzle associated with the referee object, a second set of arguments (or a second "solution") for the first puzzle, and/or a set of signatures associated with the first node and/or the second node.

In this variation, the first node generates the second transaction configured to spend the referee object via execution of the second puzzle—associated with the referee object—according to the second solution to generate a second set of outputs (or a second set of "conditions").

For example, the first node can generate the second transaction defining: the second puzzle associated with the state channel object; and the second set of arguments including the validation program, the target state of the game represented by the target virtual object, and/or a set of data representing evidence of a rule violation.

In this example, the first node can generate the second transaction configured to spend the referee object via execution of the second puzzle—associated with the referee object—according to the second set of arguments to generate the second set of outputs including a first assertion (e.g., a "TRUE" assertion) in response to verifying the rule violation.

Alternatively, the first node can generate the second transaction configured to spend the referee object via execution of the second puzzle—associated with the referee object—according to the second set of arguments to generate the second set of outputs including a second assertion (e.g., a "FALSE" assertion) in response to absence of the rule violation.

11. TOKEN HANDLER

The method S100 includes: generating a request for a token representing permission to advance a state of the game in Step S140; and transmitting the request to a token handler associated with the communication network in Step S142.

In one variation, the computer system can include a token handler (e.g., a ring token)—associated with the communication network—that controls a token representing permission to advance a state of the game.

In this variation, a first node: generates a request for the token in Step S140; and transmits the request to the token handler in Step S142.

The node executes the foregoing methods and techniques to generate a transaction configured to: spend a first virtual object defining a first state of the game; and generate a second virtual object defining a second state of the game. The first node transmits the transaction to the second node via the communication network in response to receiving the token.

Therefore, the computer system can control a turn order of the game between the first node and the second node based on the token.

12. ROUTED STATE CHANNEL

In one variation, the set of nodes implement a routed state channel blockchain object (hereinafter a "routed state channel object") based on a set of extant state channel objects. In this variation, during a first time period, the first node in the set of nodes executes the foregoing methods and techniques to generate a first state channel object in connection with an intermediary. Additionally, the second node in the set of nodes can execute the foregoing methods and techniques to generate a second state channel object in connection with the intermediary.

During a second time period succeeding the first time period, the first node (or the second node) generates a transaction configured to generate the routed state channel object based on the first state channel object and the second state channel object, the routed state channel object associated with a virtual object representing a state of a game. The first node and the second node can execute the foregoing methods and techniques to execute the game based on the routed state channel object.

In another variation, the set of nodes generates a first routed state channel blockchain object based on a second routed state channel object (e.g., based on the first state channel object and the second state channel object, based on a third routed state channel object). The set of nodes can execute the foregoing methods and techniques to execute the game based on the first routed state channel object.

Accordingly, the set of nodes can leverage pre-existing state channel objects—connected to the intermediary—to generate a routed state channel object with which to execute the game. Therefore, the set of objects can avoid generating and submitting a transaction to generate a dedicated state channel object for the game, thereby reducing a latency and cost for initiating the game.

12.1 Routed State Channel Unroll

In one implementation, a node in the set of nodes submits a transaction—to the distributed network—configured to spend the routed state channel object (or "unroll") representing a most recent state of the game stored by the node. More specifically, the first node can submit a first transaction configured to: spend the first state channel object; generate a first blockchain object associated with the first node and exhibiting a first value; and generate a second blockchain object associated with the second node and exhibiting a second value. Alternatively, the second node can submit a second transaction configured to: spend the second state channel object; generate the first blockchain object associated with the first node and exhibiting the first value; and generate the second blockchain object associated with the second node and exhibiting the second value.

In this implementation, the second node can permit the first node to unroll the routed state channel object by spending the first state channel object in response to the first transaction generating the second blockchain object associated with the second node and exhibiting the second value. Similarly, the first node can permit the second node to unroll the routed state channel object by spending the second state channel object in response to the second transaction generating the first blockchain object associated with the first node and exhibiting the first value.

13. CONCLUSION

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising:
  during a first time period:
    by a first node:
      generating a first transaction comprising a first signature associated with the first node and configured to:
        spend a first blockchain object associated with the first node and representing a first amount of an asset for a game;
        spend a second blockchain object associated with a second node and representing a second amount of the asset for the game; and
        generate a state channel object associated with an initial virtual object representing an initial state of the game, the first amount of the asset, and the second amount of the asset; and
      transmitting the first transaction to the second node via a communication network; and
    by the second node:
      cryptographically signing the first transaction based on a second signature associated with the second node as an updated first transaction; and
      transmitting the updated first transaction to a distributed network for inclusion in a first block of a blockchain;
  during a second time period succeeding the first time period, by the first node:
    generating a second transaction configured to:
      spend the initial virtual object; and
      generate a first virtual object representing a first state of the game; and
    transmitting the second transaction to the second node via the communication network; and
  during a third time period succeeding the second time period:
    generating a third transaction configured to:
      spend the state channel object associated with a target virtual object representing a target state of the game, a third amount of the asset associated with the first node, and a fourth amount of the asset associated with the second node;
      generate a third blockchain object associated with the first node and representing the third amount of the asset; and
      generate a fourth blockchain object associated with the second node and representing the fourth amount of the asset; and
    transmitting the third transaction to the distributed network for inclusion in a second block of the blockchain.

2. The method of claim 1:
  wherein generating the first transaction comprises generating the first transaction configured to generate the state channel object associated with the initial virtual object representing:
    a first sub object representing the first amount of the asset for the first node; and
    a second sub object representing the second amount of the asset for the second node; and
  wherein generating the second transaction comprises generating the second transaction configured to:
    spend the first sub object;
    generate a third sub object representing a fifth amount of the asset associated with the first state of the game; and
    generate a fourth sub object representing a sixth amount of the asset for the first node and corresponding to a difference between the first amount and the third amount.

3. The method of claim 2, further comprising, during the second time period by the second node and in response to receiving the second transaction:

generating a fourth transaction configured to:
spend the first virtual object, the second sub object, and the third sub object;
generate a second virtual object representing a second state of the game;
generate a fifth sub object representing the fifth amount of the asset associated with the first state of the game and a seventh amount of the asset associated with the second state of the game; and
generate a sixth sub object representing an eighth amount of the asset for the second node and corresponding to a difference between the second amount and the seventh amount; and
transmitting the fourth transaction to the first node via the communication network.

4. The method of claim 1:
wherein generating the third transaction comprises, by the first node:
generating the third transaction comprising the first signature; and
transmitting the third transaction to the second node; and
wherein transmitting the third transaction to the distributed network comprises:
cryptographically signing the third transaction based on the second signature as an updated third transaction; and
transmitting the updated third transaction to the distributed network for inclusion in the second block of the blockchain.

5. The method of claim 1, wherein generating the third transaction comprises generating the third transaction configured to:
spend the state channel object associated with the target virtual object representing:
a third sub object representing the third amount of the asset for the first node; and
a fourth sub object representing the fourth amount of the asset for the second node;
generate the third blockchain object associated with the first node and corresponding to the third sub object; and
generate the fourth blockchain object associated with the second node and corresponding to the fourth sub object.

6. The method of claim 1:
wherein generating the first transaction comprises generating a first transaction container comprising:
a fourth transaction configured to generate a launcher object configured to generate an announcement representing a first spend of the first blockchain object and a second spend of the second blockchain object; and
the first transaction configured to:
spend the first blockchain object;
spend the second blockchain object;
trigger the launcher object to generate the announcement in response to the first spend of the first blockchain object and the second spend of the second blockchain object; and
generate the state channel object in response to the announcement;
wherein transmitting the first transaction to the second node comprises transmitting the first transaction container to the second node via the communication network;
wherein cryptographically signing the first transaction comprises cryptographically signing the first transaction container based on the second signature an updated first transaction container; and
wherein transmitting the updated first transaction comprises transmitting the updated first transaction container to the distributed network for inclusion in the first block.

7. The method of claim 1, further comprising, during the second time period by the second node and in response to receiving the second transaction:
generating a fourth transaction configured to:
spend the first virtual object; and
generate a second virtual object representing a second state of the game and comprising a parent identifier associated with the first virtual object; and
transmitting the fourth transaction to the first node via the communication network.

8. The method of claim 7:
further comprising, by the second node:
generating a request for a token representing permission to advance a state of the game; and
transmitting the request to a token handler associated with the communication network; and
wherein transmitting the fourth transaction comprises transmitting the fourth transaction and the token to the first node via the communication network in response to receiving the token.

9. The method of claim 1, further comprising, during the second time period by the second node and in response to receiving the second transaction:
cryptographically signing the second transaction based on the second signature as an updated second transaction; and
transmitting the updated second transaction to the first node via the communication network.

10. The method of claim 1:
wherein generating the first transaction comprises generating the first transaction configured to generate an unroll object defining a timeout duration; and
wherein generating the third transaction comprises generating the third transaction configured to:
spend the unroll object and the state channel object associated with the target virtual object generated in a target transaction; and
in response to expiration of the timeout duration, trigger the unroll object to:
generate a third blockchain object associated with the first node and representing the third amount of the asset; and
generate a fourth blockchain object associated with the second node and representing the fourth amount of the asset.

11. The method of claim 10:
wherein generating the third transaction comprises generating the third transaction configured to spend the state channel object associated with the target virtual object generated in the target transaction, the target transaction:
comprising the first signature and the second signature;
configured to generate the target virtual object defining a target parity; and
defining a target sequence number; and
wherein generating the third transaction comprises generating the third transaction configured to trigger the unroll object to generate the third blockchain object and the fourth blockchain object based on the target parity and the target sequence number.

12. The method of claim 1:
wherein generating the first transaction comprises generating the first transaction configured to generate a referee object configured to verify a rule violation; and
wherein generating the third transaction comprises generating the third transaction:
defining a validation program and the target state of the game represented by the target virtual object; and
configured to:
spend the referee object and the state channel object associated with the target virtual object;
trigger the referee object to generate an assertion in response to verifying the rule violation based on the validation program and the target state of the game; and
in response to the assertion:
generate a third blockchain object associated with the first node and representing the third amount of the asset; and
generate a fourth blockchain object associated with the second node and representing the fourth amount of the asset.

13. The method of claim 12, wherein generating the third transaction comprises generating the third transaction configured to:
generate a fifth blockchain object representing the target state of the game; and
generate a sixth blockchain object representing a sixth amount of the asset associated with the target state of the game.

14. The method of claim 12, wherein generating the third transaction comprises generating the third transaction:
defining:
a puzzle associated with the referee object; and
a set of arguments comprising the validation program and the target state of the game; and
configured to:
spend the state channel object via execution of the puzzle according to the set of arguments to generate a set of blockchain objects comprising the third blockchain object and the fourth blockchain object;
generate the third blockchain object in response to execution of the puzzle according to the set of arguments; and
generate the fourth blockchain object in response to execution of the puzzle according to the set of arguments.

15. The method of claim 1, wherein generating the third transaction comprises generating the third transaction:
defining:
a puzzle associated with the state channel object; and
a set of arguments comprising the target virtual object; and
configured to:
spend the state channel object via execution of the puzzle according to the set of arguments to generate a set of blockchain objects comprising the third blockchain object and the fourth blockchain object;
generate the third blockchain object in response to execution of the puzzle according to the set of arguments; and
generate the fourth blockchain object in response to execution of the puzzle according to the set of arguments.

16. A method comprising:
during a first time period, by a first node:
generating a first transaction comprising a first signature associated with the first node and a second signature associated with a second node, the first transaction configured to:
spend a first blockchain object associated with the first node and representing a first amount of an asset for a game;
spend a second blockchain object associated with the second node and representing a second amount of the asset for the game;
generate a state channel object associated with an initial virtual object representing an initial state of the game, the first amount of the asset, and the second amount of the asset; and
generate an unroll object defining a timeout duration; and
transmitting the first transaction to a distributed network for inclusion in a first block of a blockchain;
during a second time period succeeding the first time period, by the first node:
generating a second transaction configured to:
spend the initial virtual object; and
generate a first virtual object representing a first state of the game; and
transmitting the second transaction to the second node via a communication network; and
during a third time period succeeding the second time period:
generating a third transaction configured to:
spend the unroll object and the state channel object associated with a target virtual object:
representing a target state of the game, a third amount of the asset associated with the first node, and a fourth amount of the asset associated with the second node; and
generated in a target transaction comprising the first signature and the second signature; and
in response to expiration of the timeout duration, trigger the unroll object to:
generate a third blockchain object associated with the first node and representing the third amount of the asset; and
generate a fourth blockchain object associated with the second node and representing the fourth amount of the asset; and
transmitting the third transaction to the distributed network for inclusion in a second block of the blockchain.

17. The method of claim 16:
wherein generating the first transaction comprises:
receiving the first transaction from the second node via the communication network, the first transaction comprising the second signature and configured to:
spend the second blockchain object;
generate the state channel object; and
generate the unroll object; and
generating an updated first transaction based on the first transaction, the updated first transaction:
comprising the first signature and the second signature;
configured to spend the first blockchain object;
configured to spend the second blockchain object;
configured to generate the state channel object; and
configured to generate the unroll object; and
wherein transmitting the first transaction to the distributed network comprises transmitting the updated first transaction to the distributed network for inclusion in the first block of the blockchain.

18. The method of claim 16:
wherein generating the third transaction comprises generating the third transaction configured to spend the unroll object and the state channel object associated with the target virtual object generated in a target transaction:
comprising the first signature and the second signature;
configured to generate the target virtual object defining a first parity; and
defining a target sequence number; and
wherein generating the third transaction comprises generating the third transaction configured to trigger the unroll object to generate the third blockchain object and the fourth blockchain object in response to the target sequence number exhibiting a second parity different from the first parity.

19. The method of claim 16, further comprising, during the second time period by the second node and in response to receiving the second transaction:
cryptographically signing the second transaction based on the second signature as an updated second transaction;
generating a fourth transaction configured to:
spend the first virtual object; and
generate a second virtual object representing a second state of the game and comprising a parent identifier associated with the first virtual object; and
transmitting the updated second transaction and the fourth transaction to the first node via the communication network.

20. A method comprising:
during a first time period:
by a first node:
generating a first transaction comprising a first signature associated with the first node and configured to:
spend a first blockchain object associated with the first node and representing a first amount of an asset for a game;
spend a second blockchain object associated with a second node and representing a second amount of the asset for the game; and
generate a state channel object associated with an initial virtual object representing an initial state of the game, the first amount of the asset, and the second amount of the asset; and
generate a referee object configured to verify a rule violation; and
transmitting the first transaction to the second node via a communication network;
by the second node:
cryptographically signing the first transaction based on a second signature associated with the second node as an updated first transaction; and
transmitting the updated first transaction to a distributed network for inclusion in a first block of a blockchain;
during a second time period succeeding the first time period, by the first node:
generating a second transaction configured to:
spend the initial virtual object; and
generate a first virtual object representing a first state of the game; and
transmitting the second transaction to the second node via the communication network; and
during a third time period succeeding the second time period:
generating a third transaction configured to:
spend the referee object and the state channel object associated with a target virtual object representing a target state of the game, a third amount of the asset associated with the first node, and a fourth amount of the asset associated with the second node;
trigger the referee object to generate an assertion in response to verifying the rule violation based on a validation program and the target state of the game; and
in response to the assertion:
generate a third blockchain object associated with the first node and representing the third amount of the asset; and
generate a fourth blockchain object associated with the second node and representing the fourth amount of the asset; and
transmitting the third transaction to the distributed network for inclusion in a second block of the blockchain.

* * * * *